(12) United States Patent
Kreher et al.

(10) Patent No.: US 11,306,035 B2
(45) Date of Patent: Apr. 19, 2022

(54) PROCESS TO BACTERIALLY DECOMPOSE ORGANIC WASTE

(71) Applicant: ECO-HABITAT B.V., Heiloo (NL)

(72) Inventors: Servan Kreher, Heiloo (NL); Peter Teunis, Heiloo (NL)

(73) Assignee: ECO-HABITAT B.V.

( * ) Notice: Subject to any disclaimer, the term of this patent is extended or adjusted under 35 U.S.C. 154(b) by 19 days.

(21) Appl. No.: 16/437,398

(22) Filed: Jun. 11, 2019

(65) Prior Publication Data

US 2019/0382319 A1 Dec. 19, 2019

(30) Foreign Application Priority Data

Jun. 15, 2018 (NL) .................................... 2021128

(51) Int. Cl.

| *C05F 17/957* | (2020.01) |
|---|---|
| *B01F 27/70* | (2022.01) |
| *B01F 27/721* | (2022.01) |
| *C05F 17/50* | (2020.01) |
| *C05F 17/936* | (2020.01) |
| *C05F 17/921* | (2020.01) |
| *C05F 17/964* | (2020.01) |
| *C05F 17/20* | (2020.01) |
| *C05F 17/00* | (2020.01) |

(Continued)

(52) U.S. Cl.
CPC .......... *C05F 17/957* (2020.01); *B01F 27/112* (2022.01); *B01F 27/1921* (2022.01); *B01F 27/70* (2022.01); *B01F 27/721* (2022.01); *C05F 17/00* (2013.01); *C05F 17/20* (2020.01); *C05F 17/50* (2020.01); *C05F 17/936* (2020.01); *C05F 17/939* (2020.01); *C05F 17/964* (2020.01); *Y02P 20/145* (2015.11); *Y02W 30/40* (2015.05)

(58) Field of Classification Search
CPC ........ B01F 7/0025; B01F 7/0065; B01F 7/04; B01F 7/081; C05F 7/957
USPC .................................................. 366/290, 291
See application file for complete search history.

(56) References Cited

U.S. PATENT DOCUMENTS

| 1,500,061 A | * | 7/1924 | Dimm ................. | B01F 15/0201 366/196 |
|---|---|---|---|---|
| 1,603,546 A | * | 10/1926 | Kirschbraun ............. | B01F 7/06 366/145 |

(Continued)

FOREIGN PATENT DOCUMENTS

| CN | 105565921 A | 5/2016 |
|---|---|---|
| EP | 1332805 A1 | 8/2003 |

(Continued)

OTHER PUBLICATIONS

International Search Report & Written Opinion of NL 2021128; dated Mar. 19, 2019; 11 pgs.

*Primary Examiner* — Tony G Soohoo
(74) *Attorney, Agent, or Firm* — Gardner Groff & Greenwald, PC

(57) ABSTRACT

The invention is directed to a process and equipment for use in a process to bacterially decompose organic waste to a dry composted end material wherein organic waste is composted in a composting tank in the presence of oxygen and aerobic bacteria to obtain a wet composted material. The wet composted material is partly removed from the composting tank and dried such to lower the water content of the composted material to obtain dry composted end material.

7 Claims, 5 Drawing Sheets

Figure 1:
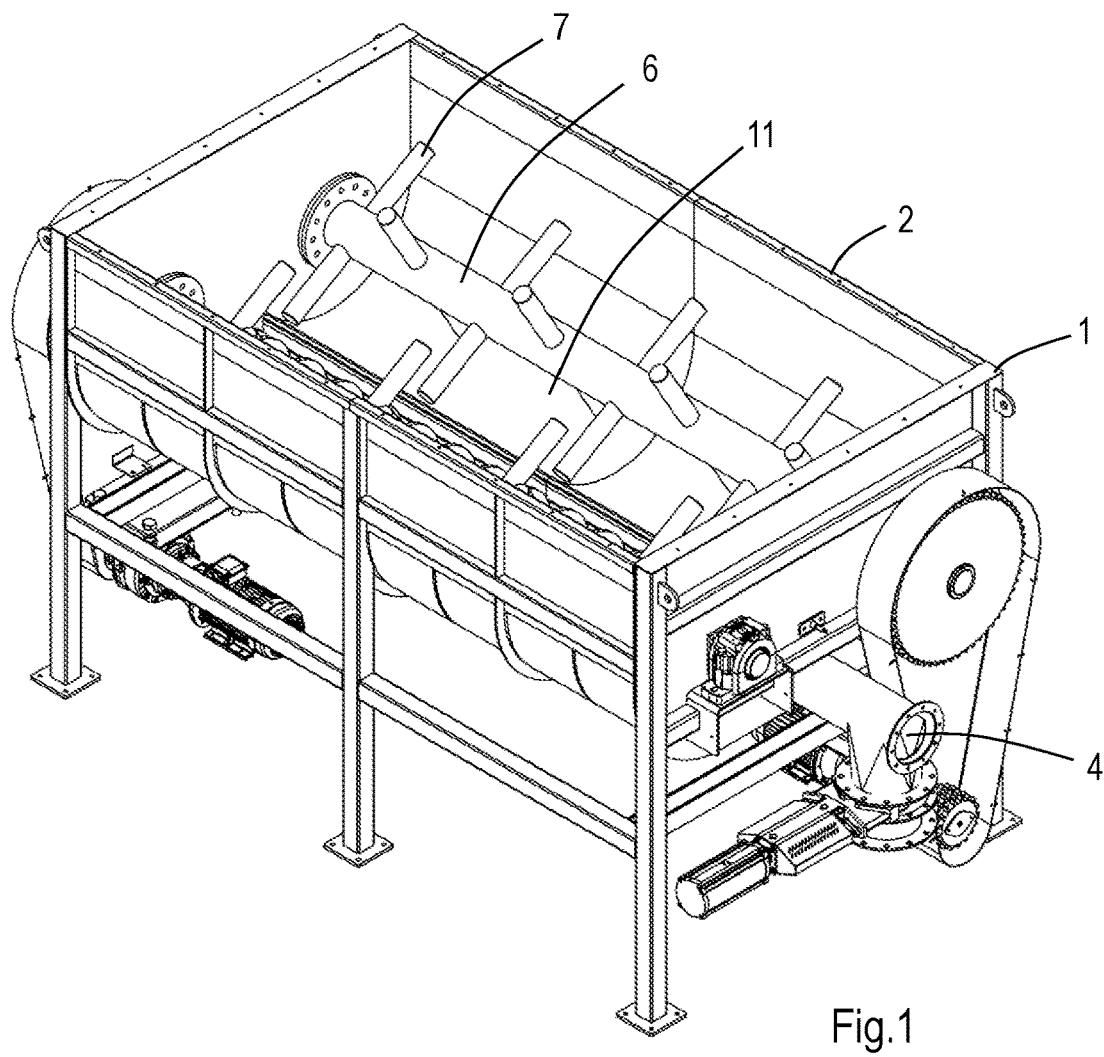

(51) Int. Cl.
*B01F 27/112* (2022.01)
*B01F 27/192* (2022.01)

(56) References Cited

U.S. PATENT DOCUMENTS

| | | | | | |
|---|---|---|---|---|---|
| 2,761,657 | A | * | 9/1956 | Rietz | F28F 5/06 165/87 |
| 2,947,524 | A | * | 8/1960 | Bridges | B01F 7/081 366/300 |
| 3,090,605 | A | * | 5/1963 | Copeland | B01F 7/081 366/298 |
| 3,104,869 | A | * | 9/1963 | August et al. | B01F 7/02 366/64 |
| 3,130,070 | A | * | 4/1964 | Potters | B29B 7/945 427/214 |
| 3,292,911 | A | * | 12/1966 | Paul | B01F 7/00208 366/313 |
| 3,421,740 | A | * | 1/1969 | Behrens | B01F 13/0035 366/186 |
| 3,638,920 | A | * | 2/1972 | Davis | B01F 7/081 366/298 |
| 3,706,442 | A | * | 12/1972 | Peat | B01F 13/0035 366/186 |
| 3,790,138 | A | * | 2/1974 | Neier | A01K 5/002 366/186 |
| 3,797,807 | A | * | 3/1974 | Behrens | B01F 13/0035 366/186 |
| 3,854,627 | A | * | 12/1974 | Coons | A21C 5/00 222/1 |
| 3,901,483 | A | * | 8/1975 | Lasar | B01F 7/088 366/193 |
| 3,942,768 | A | * | 3/1976 | Hughes | A01K 5/002 366/297 |
| 4,269,582 | A | * | 5/1981 | Melia | A21C 1/06 366/187 |
| 4,369,927 | A | * | 1/1983 | Rozeboom | B01F 13/0035 241/101.76 |
| 4,411,682 | A | | 10/1983 | Brill | |
| 4,462,693 | A | * | 7/1984 | Buschbom | A01K 5/002 366/189 |
| 4,480,927 | A | * | 11/1984 | Peat | A01K 5/002 366/299 |
| 4,484,606 | A | * | 11/1984 | Kosters | A01F 25/14 141/114 |
| 4,707,140 | A | * | 11/1987 | Mohrlang | A01K 5/002 366/186 |
| 4,954,303 | A | * | 9/1990 | Moore | B29C 48/76 264/101 |
| 5,083,506 | A | * | 1/1992 | Horn | B01F 7/025 99/348 |
| 5,299,865 | A | * | 4/1994 | Presnell | B01F 7/00433 366/300 |
| 5,354,127 | A | * | 10/1994 | Del Zotto | B01F 7/087 366/186 |
| 5,379,940 | A | * | 1/1995 | Knight | A01C 3/063 239/675 |
| 5,385,403 | A | * | 1/1995 | Knight | A01C 3/063 239/675 |
| 5,435,494 | A | * | 7/1995 | Knight | A01C 3/06 239/675 |
| 5,505,542 | A | * | 4/1996 | Braeker | A23G 1/14 366/299 |
| 6,531,311 | B2 | | 3/2003 | Ueda | |
| 8,177,419 | B2 | * | 5/2012 | Neier | B01F 15/00792 366/299 |
| 9,420,759 | B2 | * | 8/2016 | Aton | A01K 5/0258 |
| 2009/0268549 | A1 | * | 10/2009 | Neier | B01F 7/00883 366/290 |
| 2017/0137331 | A1 | | 5/2017 | Charreyre | |
| 2018/0148391 | A1 | | 5/2018 | Ashbee et al. | |

FOREIGN PATENT DOCUMENTS

| | | |
|---|---|---|
| EP | 2284129 A1 | 2/2011 |
| JP | H1147725 A | 2/1999 |
| JP | 2003306394 A | 10/2003 |
| JP | 2008281264 A * | 11/2008 |
| JP | 2008281264 A | 11/2008 |
| WO | 2005044756 A1 | 5/2005 |
| WO | 2015177486 A1 | 11/2015 |

* cited by examiner

PROCESS TO BACTERIALLY DECOMPOSE ORGANIC WASTE

The invention is directed to a process to bacterially decompose organic waste to a dry composted end material wherein organic waste is composted in a composting tank in the presence of oxygen and aerobic bacteria.

Such a process is known from for example U.S. Pat. No. 6,531,311. This publication describes a multi stage composting process consisting of three fermentation tanks in series. Composted material is transported from one tank to the next using a screw conveyor. The tanks are provided with a vent for discharging evaporated water. This water is a by-product of the composting process.

A disadvantage of the process of U.S. Pat. No. 6,531,311 is that large volumes of humid air are discharged from the individual tanks. This makes the process less suited to be installed at locations where large volumes of organic waste are produced, such as hospitals and large hotels.

US2017/0137331 describes a composting process wherein after a first composting step the composted materials are dried and separated into a heavy waste materials and light waste materials. The light waste materials, after wetting these materials, are subjected to a next composting step. A disadvantage of this process is that a high amount of materials handling is involved, thereby making the process not suited to be carried out at locations such as hospitals and large hotels by their personnel. This because of the industrial scale at which the process according to this patent is preferably performed.

The present invention is aimed at a process which can be used at locations where organic waste is generated and which does not require a large scale or many materials handling operations.

This aim is achieved by the following process. Process to bacterially decompose organic waste material to a composted material in a series of two or more composting reactor spaces of one or more composting tanks in the presence of oxygen and aerobic bacteria, wherein in a batch operation waste material is added continuously or intermittently to the first reactor space of two or more composting reactor spaces which reactor space comprises composted material from an earlier batch and aerobic bacteria and wherein the content of the first reactor space is partly removed from the first reactor space as intermediate wet composted material comprising aerobic bacteria at the end of the batch operation and wherein part of the composted material and aerobic bacteria remain in the first reactor space for performing a next batch operation and wherein the batch operation in the first reactor space has a duration of between 10 and 30 hours as calculated from the start of the addition of waste material in the batch operation to the start of removing wet intermediate composted material from the first reactor space.

Applicants found that the process is suited to be operated by users which do not have to be trained as a process operator. The process may be used by for example hotel staff, supermarket staff or hospital staff without any significant training. The amount of materials handling is minimal and involves adding waste material to the first reactor at the start or while performing the first batch, transferring part of the content of the first reactor to the second reactor and removing the composted material from the second reactor at the end of the batch operation. This is significantly less than the materials handling of the prior art process US2017/0137331. Applicants found that waste material can be converted to composted material in an efficient manner.

Such a process is advantageous because it allows a user to continuously or intermittedly add organic waste to the first reactor space during one batch operation of such a reactor space. Such a batch operation may for example be performed during normal working hours. At the end of the batch operation of this first reactor space some organic waste will not have been fully converted. This conversion will take place in the next reactor space. Suitably the average residence time of the solid material in the consecutive reactor space increase. Because the volume of the solid material reduces in every step the volume of the consecutive reactor spaces does not necessarily increases and can even be the same or smaller.

Further advantages will be discussed in combination with the preferred embodiments.

The composted material as it is discharged from the compositing tank as composted material may have a water content of between 20 and 90 wt. % and preferably between 50 and 70 wt. %. This is especially the case when water is not actively removed in the composting steps. Applicant found that composting can be achieved while not actively removing produced water. The higher viscosity of the composted material could result in that the material cannot be stirred or agitated sufficiently to operate the process. For such a situation one may suitably use a special reactor as described below. The thus obtained wet composted material is preferably dried in a separate drying step. In this ay water is collected in a more controlled manner. A further advantage is that the process is more energy efficient. By not or almost not aiming to ventilate and thereby dry the contents in the composting tank a desired temperature in the composting tank can be maintained more easily.

In the separate drying step the water content of the composted material is reduced. Preferably the water content is reduced by more than 5 wt. % points, more preferably by more than 10 wt. % points and even more preferably by more than 20 wt. % point. For example, the water content is reduced by 10 wt. % points when the wet composted material has a water content of 30 wt. % and the dry composted end material has a water content of 20 wt. %. The water content of the dry composted material may thus range from relatively high values to low values depending on the water content of the wet composted material and the reduction in water content achieved in the drying step. Preferably the water content of the dry composted material is below 40 wt. % and even more preferably below 30 wt. %.

Drying of the wet composted material may be performed by any known method for removing water from solid materials. Preferably processes are used making use of machines or apparatus with progressive movement for drying batches of wet composted material. Such movement may be horizontal, vertical, in several horizontal planes above each other or helical. Preferably the movement is all horizontal or slightly inclined and preferably the material is being carried by endless belts in the drying step. Example of a suitable machine is a conveyor-belt drier. The temperature in the drying step may be between. 30° C. and 70° C.

The composting may be performed by well-known composting techniques wherein aerobic bacteria decompose the organic waste to carbon dioxide, water and composted material. Examples of such processes are described in the earlier referred to U.S. Pat. No. 6,531,311. The composted material will comprise of inorganic material and non-converted organic material. The organic waste may be food waste, for example obtained when preparing food in larger kitchens or left-overfood, cellulose based waste, such as sanitary napkins, diapers and tissues, yard waste, such as for example grass clippings, leaves, tree clippings and brush and vegetable processing waste, such as obtained in greenhouses. The organic waste may be added to the composting tank as such or may be reduced in size.

A skilled person will be able to choose the optimal process conditions for the composting process. Composting is a biological process and requires an organic feed, a suitable microbial population within the compositing tank, a controlled rate of microbial growth and a controlled size and nature of the microbial population. Oxygen may be added by means of an aeration medium, such as air, to insure aerobic activity. Gases generated by the process may be discharged from the composting tank. The temperature is controlled such that most of the water formed remains in the composting tank and is not discharged together with such excess gasses.

To maintain a constant microbiological activity in the composting tank the conditions for microbial growth, such as nutrient level, oxygen availability and temperature, are controlled. The microbial growth is ensured by adding fresh organic waste to the composting tank or to the first reactor space. Preferably the atomic carbon to nitrogen ratio is 15:1 to 50:1, and more preferably 15:1 to 30:1, in the organic waste. If the nitrogen level is too low additional nitrogen rich waste may be added.

Fresh aerobic bacteria may be added to the reactors, preferably at least to the first reactor, while performing the process. This may be performed by an automated feeder which adds the bacteria at predetermined times and predetermined quantities in the batch operation. The fresh bacteria are preferably present in a composition further comprising a bacterial growth medium being at least one member of the group consisting of maltodextrin, AGAR broth medium, Lithothamnium Calcareum, DNA and RNA nucleic acids, extracts of Laminariae Stipites, and extracts of Fucus Vesiculosus.

Applicants found that an even more advantageous process is obtained when the organic waste is composted in a series of two or more composting reactor spaces of one or more composting tanks in the presence of oxygen and aerobic bacteria. The composting in the reactor spaces suitably take place as a semi-batch type operation.

The batch operation in the first reactor space suitably has a duration of between 10 and 30 hours as calculated from the start of the addition of waste material in the batch operation to the start of addition of waste material in a next batch operation. The intermediate wet composted material obtained from the first reactor space may be added to a second reactor space wherein the intermediate wet composted material is kept for at least 8 hours in a batch operation to obtain wet composted material. In such a second reactor space the intermediate wet composted material is suitably kept for at most 48 hours in a batch operation. The optimal time will depend on the type of waste material used, wherein for example citrus fruit shells may be processed in a shorter time and waste containing also meat and fish will require a longer batch time. Suitably between 70 and 100 wt. % of the content of the second reactor space is removed from the second reactor space as composted end material. Such a removal of composted end material may be performed gradually and in line with the capacity of the optional dryer like for example the capacity of the desired belt dryer. Applicants found that an acceptable conversion may be achieved in two such consecutive steps. However additional composting steps may be applied, for example in combination with shorter residence times in the second and further reactor spaces.

Preferably waste material is added continuously or intermittedly in a batch operation to the first reactor space of two or more composting reactor spaces which reactor space comprises wet composted material from an earlier batch and aerobic bacteria and wherein the content of the first reactor space is partly removed from the first reactor space as intermediate wet composted material comprising aerobic bacteria at the end of the batch operation and wherein part of the wet composted material and aerobic bacteria remain in the first reactor space for performing a next batch.

Fresh organic waste may be added at the beginning of the batch operation or may be continuously or intermittently added in one batch operation to the first reactor space during the entire duration of the batch operation. Suitably at least 80 wt. % of the organic waste is added to the first reactor space in a period between 0 and 24 hours from the start of the addition of waste material in the batch operation. Fresh organic waste added at the end of the batch operation will not have been composted to a large degree. This is however not a problem because the final composting may take place in a further reactor space. If the residence time in a second reactor space is sufficiently long an acceptable composting conversion may be achieved using only two reactor spaces in series as will be described below.

By leaving part of the wet composted material and aerobic bacteria in the first reactor space a reactive environment is maintained in this reactor space which can convert fresh waste material added in the next batch. Preferably between 10 and 40 wt. % of the content of the first reactor space remains in the first reactor space at the end of the batch operation when the content of the first reactor space is partly removed from the first reactor space as intermediate wet composted material.

The temperature in the composting tank or in the separate reactor spaces is suitably between 50° C. and 70° C. The temperature may be controlled by heating the content of the reactor space by heat transfer via the walls of the reactor space or reactor tank. The wet composted material as present in the composting tank or reactor spaces may be removed from said reactor space or composting tank by any suitable means, for example by means of a screw feeder. Such a screw feeder may be orientated such to transport the wet intermediate composted material in a horizontal direction, preferably along the bottom of the reactor space or tank, to an outflow opening of the composting tank or reactor space.

Examples of suitable composting tanks or the individual reactor spaces suited for performing the above process are described in CN105565921, EP1332805, JP3074473B, JP2003306394 and WO2005044756. Preferably the below described equipment is used. The invention is therefore also directed to the following organic waste composting equipment. Applicants found that such an equipment is suitable to compost the organic waste while not actively removing the produced water. The invention is thus also directed to the use of such an equipment as the first reactor space or the second reactor space of the earlier described process and even more especially when such an equipment is used Reference is made to FIGS. 1-4 when describing the novel organic waste composting equipment according this invention.

Figure 2:
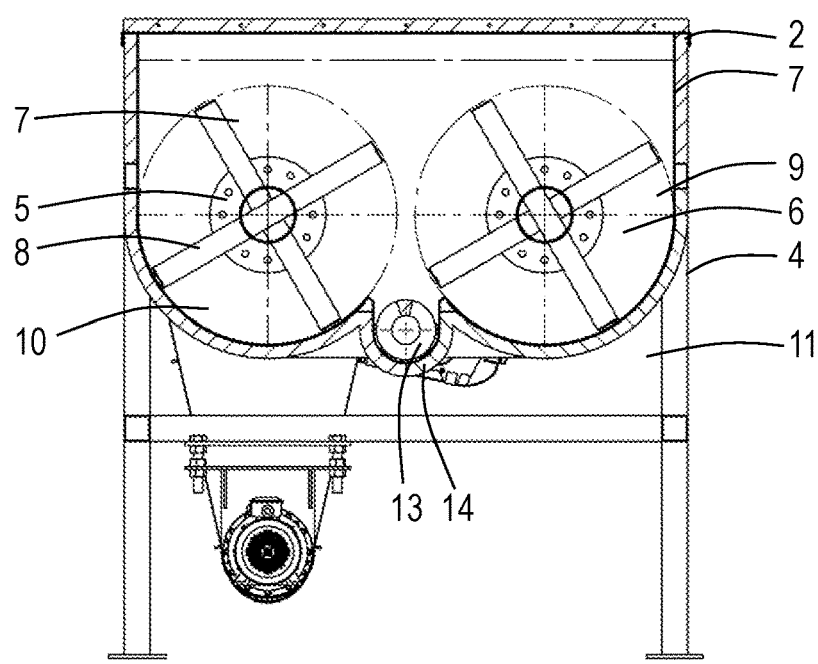

FIG. 1 shows the organic waste composting equipment (1) according to the invention from above and without a cover. The equipment (1) is provided with an elongated tank (2) into which organic waste can be charged. An outlet (4) for composted material is shown. The tank (2) is provided with two rotating mixing shafts (5,6) provided with radially extending agitating blades (7) fixed to the shaft (5,6), wherein the two shafts (5,6) of which in FIG. 1 only one is visible. An elongated semi-tubular surface (11) is visible as the lower inner wall (12) of the tank (2), FIG. 2 shows a cross-sectional view of the tank (2) of FIG. 1. Both rotating mixing shafts (5,6) are shown provided with agitating blades (7). Two cylindrical mixing zones (8,9) in the tank (2) are shown positioned substantially parallel with respect to each other in the elongated direction of the tank (2). Two cylindrical mixing zones (8,9) are shown and a screw feeder (13) is positioned at the lower inner wall (12) of the tank (2) between two, suitably heated, semi-tubular surfaces (10,11) and positioned in a tubular housing (14) which tubular housing (14) is open at its upper end facing the interior (15) of the tank (2) and wherein in use composted material may be moved to the outlet (4) for composted material. Each semi-tubular surface (10,11) may have a radius (16) running from the rotating shaft (5,6) of the cylindrical mixing zone as shown in this Figure.

Figure 3:
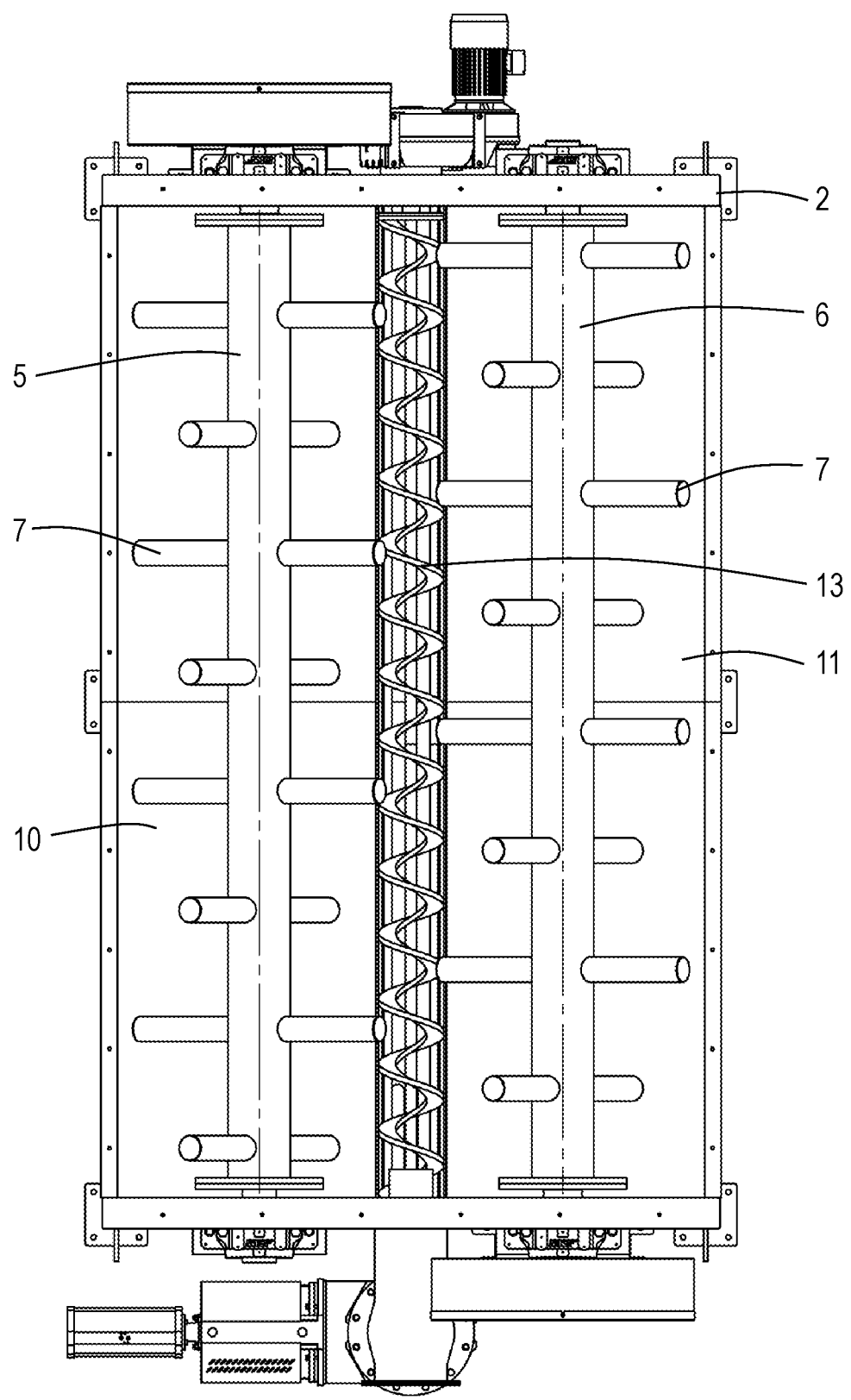

FIG. 3 shows the tank (2) as of FIG. 1 from above.

Figure 3A:
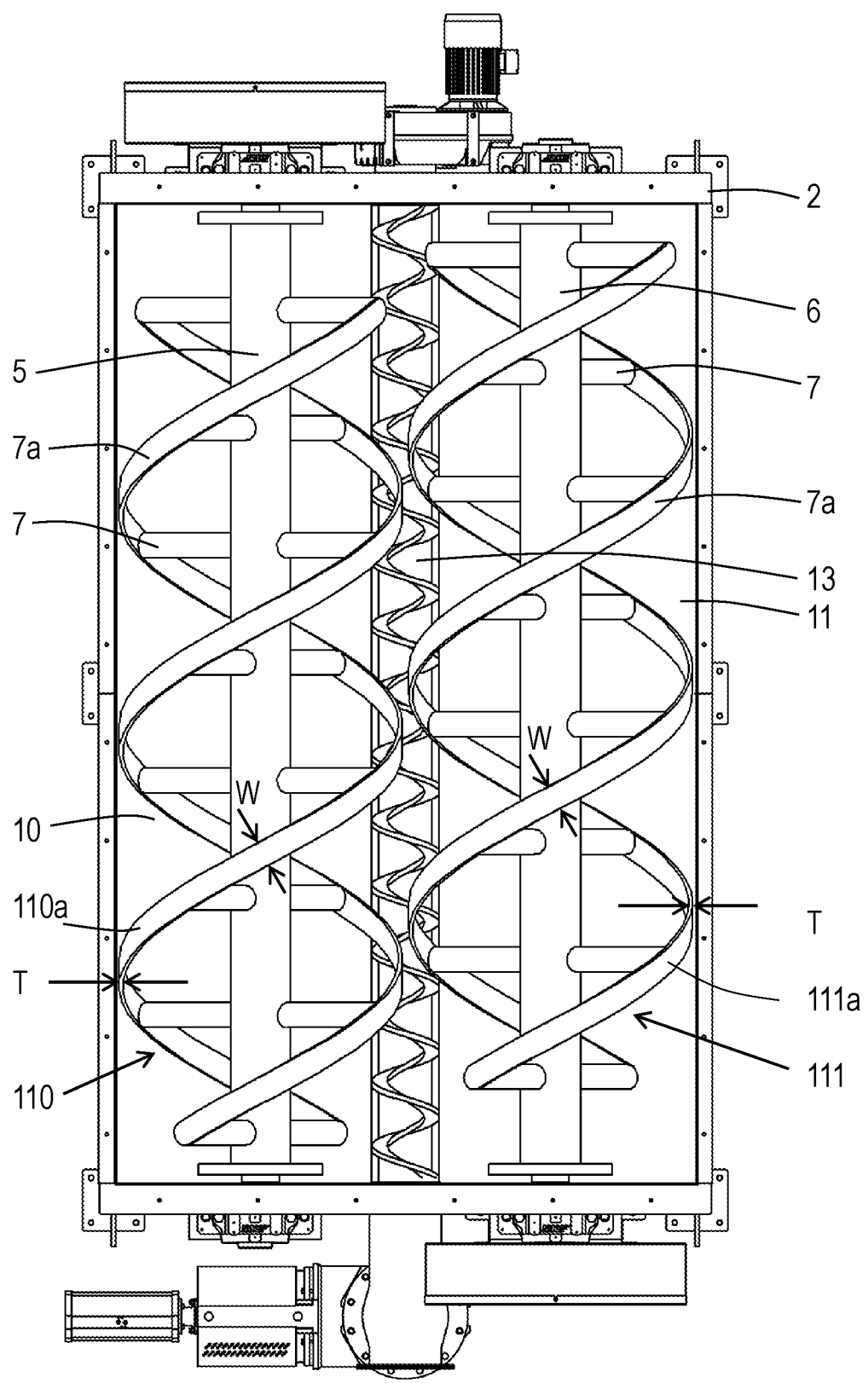

FIG. 3a shows the tank as in FIGS. 2 and 3 except that a helical mixing element (7a) is connected to the shafts (5,6) by supports (7) which radially extend from the shaft (5,6). The helical mixing element is suitably a blade (110, 111) which runs at a certain distance from the semi-tubular surfaces (10,11). The blade (110, 111) is suitably shaped such that the entire radially-outwardly facing surface (110a, 111a) of the blade is spaced apart from the two semi-tubular surfaces (10,11) at a constant distance. It has been found that this distance is preferably minimal such that the blades may remove any deposits formed on the semi-tubular surfaces (10,11). Preferably this distance is smaller than 1 cm and more preferably smaller than 0.5 cm. The minimal distance will be determined by the requirement that the blades are spaced apart from the semi-tubular surfaces such that the mixing element may rotate within the tank (2). The radially-outwardly facing surfaces (110a, 111a) of the blades (110, 111) define a major surface area having a width (W) transverse to the blade's helical direction. The blades (110, 111) further define a minor surface area having a thickness (T) in the radial dimension. The width (W) is substantially greater than the thickness (T).

Figure 4:
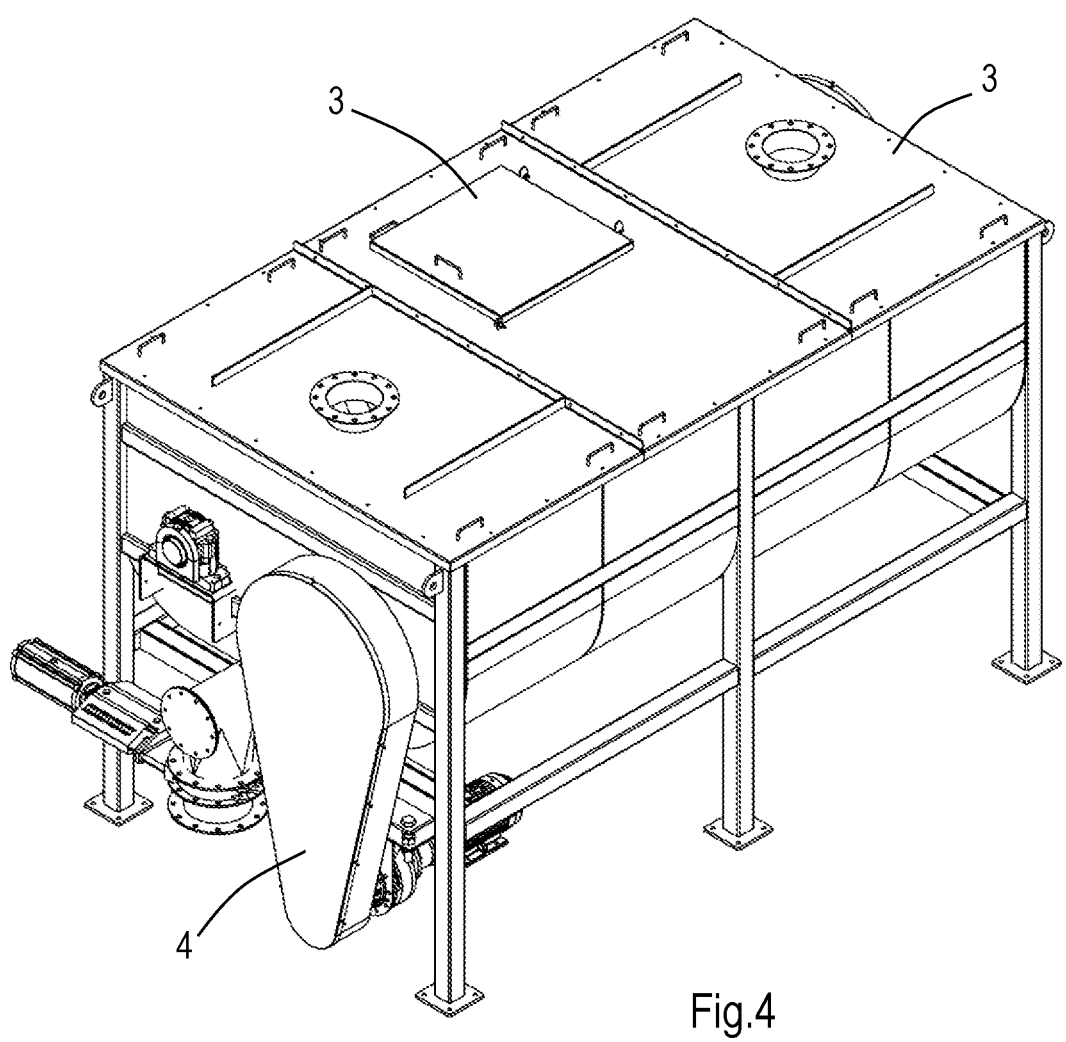

FIG. 4 shows the tank (2) of FIG. 1 with a cover (16) and an inlet (3) for organic waste and an inlet (17) and outlet (18) for of air.

Figure 5:
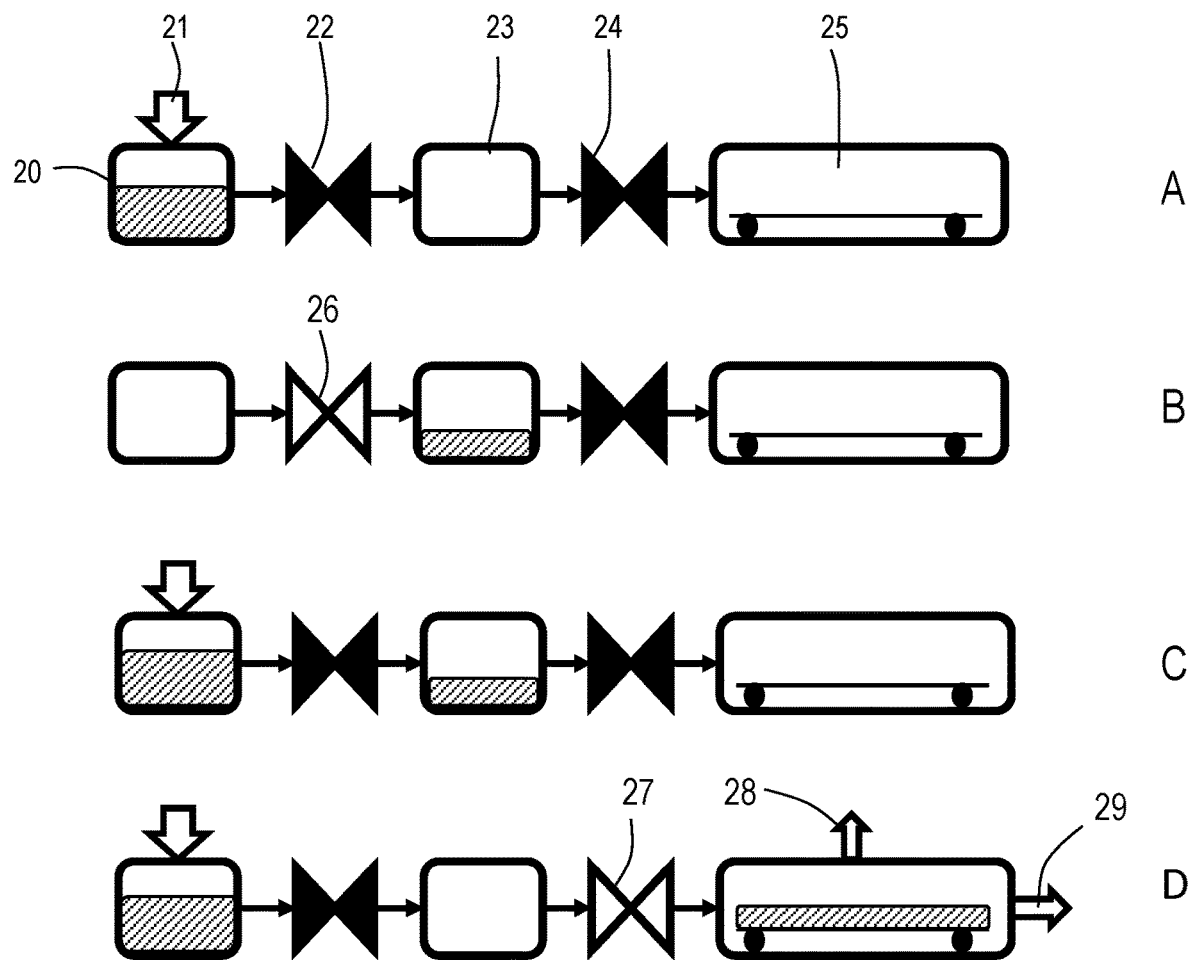

FIG. 5 shows 4 sequential stages how the process may be performed in a semi-batch type of operation. In stage A organic waste (21) is intermittedly added to first reactor space (20). Valve (22) is closed. In second reactor space (23) intermediate wet composted material from earlier batches of first reactor space (20) is further composted. Valve (24) is closed and no material is dried on belt dryer (25). In stage B part of the content of first reactor space (20) is transported via open valve (26) to second reactor space (23). Valve (24) remains closed and no material is dried on belt dryer (25). In a next stage C the operation mode of organic waste (21) is added to first reactor space (21) and composting takes place in second reactor space (23). Stages A-C are repeated until the content of wet composted material in the second reactor space (23) reaches a predetermined level and wherein the average residence time of the organic waste in the second reactor space (23) is sufficiently high that almost all of the organic waste has been composted. For example, stages A-C may be repeated 3 to 5 times before performing stage D. In stage D the content of second reactor space (23) is transported to belt dryer (25) via open valve (27) where evaporated water (28) is separated from the composted material to obtain dry composted end material (29). The maximum rate of emptying of the second reactor space (23) may be determined by the speed at which the composted material dries on the belt dryer (25). Once all the wet composted material is dried the system may return to stage A after closing valve (27). The scheme of stages shows that water (28) is only obtained in stage D. Thus the process according this invention does not continuously produce water, as part of gaseous effluents, but only in stage D. The collection of water in stage D can furthermore be more efficient because the evaporated water content of the gas as it leaves the dryer (28) can be significantly higher than the water content in the prior art processes leaving the composting tank.

The invention shall be illustrated by the following example.

EXAMPLE 1

A composting reactor as show in FIG. 3a and having a distance between the helical mixing element (7a) and the semi-tubular surfaces (10,11) of a few millimeters is used in this example. To this reactor 5000 kg of a biological waste, consisting of vegetables, fruit excluding citrus fruit shells, meat and fish in about equal proportions as obtained in a Dutch hospital as leftovers or as outdated food products was added. 100 kg composted material was already present in the reactor from a previous batch. This material consisted also of the aerobic composting bacteria. 5 kg of fresh bacteria on a Lithothamnium Calcareum support was added after 8 hours and another 5 kg of fresh bacteria was added after 16 hours. The mass in the reactor was stirred at a temperature of 55° C. After 24 hours 80 wt. % of the content of the reactor was discharged using the screw feeder.

The discharged intermediate wet composted material comprising the aerobic bacteria was added to a second reactor. The second reactor was a copy of the first reactor. The content of the second reactor was stirred for 24 hours at a temperature of between 45 and 50° C.

The thus obtained composted material contained 23 wt % water. The material was dried using a belt dryer using air having a temperature of 110° C. A composted and dried matter was obtained having the following properties as listed in Table 1.

TABLE 1

| Example | Unit | 1 | 2 |
|---|---|---|---|
| Dry matter | kg/kg fresh waste | 0.824 | 0.813 |
| Total nitrogen (N) | kg/kg fresh waste | 0.0299 | 0.0252 |
| Phopshate ($P_2O_5$) | kg/kg fresh waste | 0.0068 | 0.0066 |
| Pottasium ($K_2O$) | kg/kg fresh waste | 0.0104 | 0.0098 |
| Magnesium (MgO) | kg/kg fresh waste | 0.001 | 0.001 |
| Sulphur (S) | kg/kg dry matter | 0.003 | 0.0042 |
| Chloride (Cl) | kg/kg dry matter | 0.0064 | 0.0062 |
| Sodium (Na) | kg/kg fresh waste | 0.0099 | 0.0098 |
| Organic matter | wt % of dry matter | 94.9 | 94.7 |
| pH | — | 4.4 | 4.2 |
| Hg | mg/kg dry matter | <0.050 | <0.050 |
| Pd | mg/kg dry matter | <5.0 | <5.0 |
| As | mg/kg dry matter | <3.0 | <3.0 |

EXAMPLE 2

Example 1 was repeated except that a the waste also contained orange shells. The composition of the dry matter as obtained in listed in Table 1. The dry matter as obtained in Examples 1 and 2 had properties which make it suitable as compost for plants not sensitive for chloride. A suitable dose would be between 0.5 and 0.75 kg/m2, preferably before the seeds are planted and propagated.

EXAMPLE 3

Example 1 was repeated using a reactor as shown in FIG. 3 (without the helix strips) for first and second reactor. This resulted in that the mixing in the reactors was not optimal and that 45 wt % of the material was not fully composted.

The invention claimed is:

1. Organic waste composting equipment for bacterially decomposing organic waste material to composted material, the organic waste composting equipment comprising:
   an elongated tank into which organic waste material can be charged, the elongated tank comprising an inlet for receiving organic waste material, an outlet for discharging composted material, and a tank interior comprising a first cylindrical mixing zone and a second cylindrical mixing zone, wherein the first and second cylindrical mixing zones are at least partially defined by first and second elongated heated semi-tubular surfaces, respectively, of a lower inner wall of the elongated tank;
   a first rotating mixing shaft and a second rotating mixing shaft rotatably mounted within the tank interior, the first and second rotating mixing shafts comprising helical mixing blades connected thereto by one or more supports radially extending from the first and second rotating mixing shafts, wherein each of the helical mixing blades comprises a radially-outwardly facing surface spaced apart from and facing the semi-tubular surfaces, the radially-outwardly facing surfaces each defining a major surface area having a width transverse to the helical direction, and wherein each of the helical mixing blades further comprises a minor surface area having a thickness in the radial dimension, wherein said width is substantially greater than said thickness; and
   a screw feeder rotatably mounted in a tubular housing at the lower inner wall between the first and second elongated heated semi-tubular surfaces, the tubular housing comprising an upper opening open to the tank interior,
   wherein the first and second rotating mixing shafts are positioned substantially parallel with respect to each other in the elongated direction of the tank,
   wherein the first rotating mixing shaft is positioned concentrically with the first elongated heated semi-tubular surface, and
   wherein the second rotating mixing shaft is positioned concentrically with the second elongated heated semi-tubular surface.

2. Organic waste composting equipment according to claim 1, wherein the helical mixing blades comprise exterior surfaces and wherein a constant distance is maintained between the exterior surfaces and the elongated heated semi-tubular surfaces.

3. Organic waste composting equipment according to claim 2, wherein the constant distance is less than 0.5 cm.

4. Organic waste composting equipment according to claim 2, wherein the constant distance is less than 1 cm.

5. Composting equipment for bacterially decomposing organic waste material to composted material, the composting equipment comprising:
   an elongated tank defining an interior into which organic waste material can be loaded, the elongated tank comprising an inlet opening for receiving organic waste material and an outlet opening for expelling composted material therethrough, and wherein the tank is provided with rotating mixing shafts provided with helical mixing elements connected to the mixing shafts by supports radially extending from the mixing shafts, wherein the mixing shafts are positioned substantially parallel with respect to each other in an elongated direction of the elongated tank thereby defining cylindrical mixing zones in the tank,
   wherein the cylindrical mixing zones are at least partially defined by elongated heated semi-tubular surfaces along a lower inner wall of the elongated tank,
   wherein a screw feeder is positioned in a tubular housing between the semi-tubular surfaces, the tubular housing comprising an opening towards the interior of the tank,
   wherein the screw feeder expels composted material through the outlet, and
   wherein the helical mixing elements comprise a radially-outwardly facing surface spaced apart from and maintained at a constant distance from the elongated heated semi-tubular surfaces, the radially-outwardly facing surface defining a major surface area having a width transverse to the helical direction, and wherein the helical mixing elements further comprises a minor surface area having a thickness in the radial dimension, wherein said width is substantially greater than said thickness.

6. Composting equipment according to claim 5, wherein the constant distance is less than 1 cm.

7. Composting equipment according to claim 6, wherein the helical mixing elements are helical blades.

* * * * *